United States Patent
Chen et al.

(10) Patent No.: US 11,576,177 B2
(45) Date of Patent: Feb. 7, 2023

(54) METHOD AND TERMINAL DEVICE FOR DETERMINING PRIORITIES OF MULTIPLE BWPS

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 130 days.

(21) Appl. No.: 17/013,072

(22) Filed: Sep. 4, 2020

(65) Prior Publication Data

US 2020/0404661 A1   Dec. 24, 2020

Related U.S. Application Data

(63) Continuation of application No. PCT/CN2018/078345, filed on Mar. 7, 2018.

(51) Int. Cl.
*H04W 72/04* (2009.01)
*H04W 72/10* (2009.01)
(Continued)

(52) U.S. Cl.
CPC ......... *H04W 72/0453* (2013.01); *H04L 5/001* (2013.01); *H04L 5/0053* (2013.01);
(Continued)

(58) Field of Classification Search
CPC .......... H04W 72/0453; H04W 72/042; H04W 72/10; H04W 52/146; H04W 52/325;
(Continued)

(56) References Cited

U.S. PATENT DOCUMENTS

2020/0280894 A1* 9/2020 Koskinen .............. H04W 48/16
2021/0176757 A1* 6/2021 Hwang ............... H04W 72/042

FOREIGN PATENT DOCUMENTS

CN       106255215 A      12/2016
CN       106572538 A       4/2017
(Continued)

OTHER PUBLICATIONS

English Translation of WO 2019/033302 A1. Aug. 16, 2017, [Retrieved online May 10, 2022] Retrieved from World Intellectual Patent Office using Internet < URL: https://patentscope.wipo.int/search/en/detail.jsf?docId=WO2019033302&_cid=P11-L30Y6Y-65860-1#atapta0>. (Year: 2017).*

(Continued)

*Primary Examiner* — Omar J Ghowrwal

(57) ABSTRACT

The present disclosure discloses a method for transmitting data on a bandwidth part, a terminal device, a network device, and a computer storage medium, where the method includes: determining a priority of at least one bandwidth part BWP; and according to the priority of the at least one BWP, performing a signal transmission in at least part of the at least one BWP, or, reporting uplink control information (UCI) corresponding to at least part of the at least one BWP.

20 Claims, 2 Drawing Sheets

Configuring a priority of at least one bandwidth part BWP for a terminal device — 201

According to the priority of the at least one BWP, performing a signal transmission in at least part of the at least one BWP, or, receiving uplink control information UCI which is reported by the terminal device and corresponds to at least part of the at least one BWP — 202

(51) Int. Cl.
  *H04L 5/00* (2006.01)
  *H04W 52/14* (2009.01)
  *H04W 52/32* (2009.01)
  *H04W 72/12* (2009.01)

(52) U.S. Cl.
  CPC ......... *H04L 5/0098* (2013.01); *H04W 52/146* (2013.01); *H04W 52/325* (2013.01); *H04W 72/042* (2013.01); *H04W 72/0413* (2013.01); *H04W 72/10* (2013.01); *H04W 72/1289* (2013.01)

(58) Field of Classification Search
  CPC .......... H04W 72/0413; H04W 72/1289; H04L 5/001; H04L 5/0053; H04L 5/0098
  See application file for complete search history.

(56) References Cited

FOREIGN PATENT DOCUMENTS

| CN | 107534981 A | 1/2018 | |
|---|---|---|---|
| CN | 107733616 A | 2/2018 | |
| CN | 107770794 A | 3/2018 | |
| WO | WO-2019033302 A1 * | 2/2019 | ............. H04B 7/005 |

OTHER PUBLICATIONS

3GPP TSG-RAN1 Meeting AH18-01 R1-1801291; draftCR to 38.211 capturing the Jan. 18 ad-hoc meeting agreements, Vancouver, Canada, Jan. 22-26, 2018.

3rd Generation Partnership Project,3GPP TS 38.213 V15.0.0(Feb. 2018); Technical Specification Group Radio Access Network;NR;Physical layer procedures for control(Release 15).

The EESR of corresponding European application No. 18908532.7, dated Feb. 10, 2021.

OPPO:"Remaining issues on bandwidth part configuration and activation", 3GPP Draft; R1-1719975, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 18, 2017(Nov. 18, 2017), XP051369671.

VIVO: "Remaining issues on UL data transmission procedure", 3GPP Draft; R1-1800204 Remaining Issues on UL Data Transmission Procedure, 3rd Generation Partnership Project (3GPP), Mobile Competence Centre; 650, Route Des Lucioles; F-06921 Sophia-Antipolis Cede, vol. RAN WG1, No. Vancouver, Canada; Jan. 22, 2018-Jan. 26, 2018 Jan. 13, 2018(Jan. 13, 2018), XP051384693.

Intel Corporation: "On UL control channel design aspects for URLLC", 3GPP Draft; R1-1717392 Intel-UL_Control Reliability, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 Oct. 8, 2017(Oct. 8, 2017), XP051340582.

VIVO: "Remaining details on CSI reporting", 3GPP Draft; R1-1719768 Remaining Details on CSI Reporting, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27. 2017-Dec. 1, 2017 Nov. 18, 2017(Nov. 18, 2017), XP051369511.

VIVO: "NR UL power control framework", 3GPP Draft; R1-1715651_NR UL Power Control Framwork, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017(Sep. 17, 2017), XP051339117.

International Search Report(ISR) dated Nov. 23, 2018 for Application No. PCT/CN2018/078345.

The first Office Action of corresponding European application No. 18908532.7, dated Dec. 7, 2022.

* cited by examiner

METHOD AND TERMINAL DEVICE FOR DETERMINING PRIORITIES OF MULTIPLE BWPS

CROSS-REFERENCE TO RELATED APPLICATIONS

This application is a continuation of International Application No. PCT/CN2018/078345, filed on Mar. 7, 2018, the disclosure of which is hereby incorporated by reference in its entirety.

TECHNICAL FIELD

The present disclosure relates to the field of information processing technologies and, in particular, to a method for transmitting data on a bandwidth part, a terminal device, a network device and a computer storage medium.

BACKGROUND

In a new radio (NR) system, one carrier can contain up to four bandwidth parts (BWPs), and the network side can dynamically activate some of the BWPs for data transmission or reference signal transmission. Different BWPs can have different allocated bandwidths and be used for data transmission of different service types. For example, one BWP can be used for enhanced mobile broadband (eMBB) data transmission, and another BWP can be used for ultra-reliable low-latency communications (URLLC) data transmission. Because data of different service types has different priorities, the terminal needs to preferentially guarantee the transmission performance of high-priority data. The current protocol cannot distinguish the priorities of different BWPs, and the transmission performance of high-priority data cannot be guaranteed preferentially. Further, if the BWP is activated through downlink control information (DCI), data of which service type is transmitted on a BWP is dynamically scheduled by the network side, and the priority needs to be indicated by the same dynamic signaling, which however is not supported by the current technology.

SUMMARY

In order to solve the above technical problems, embodiments of the present disclosure provide a method for transmitting data on a bandwidth part, a terminal device, a network device and a computer storage medium.

An embodiment of the present disclosure provides a method for transmitting data on a bandwidth part, which is applied to a terminal device, where the method includes: the step of determining a priority of at least one bandwidth part BWP; according to the priority of the at least one BWP, the step of performing a signal transmission in at least part of the at least one BWP, or, reporting uplink control information (UCI) corresponding to at least part of the at least one BWP.

An embodiment of the present disclosure provides a method for transmitting data on a bandwidth part, which is applied to a network device, wherein the method includes: the step of configuring a priority of at least one bandwidth part BWP for a terminal device; according to the priority of the at least one BWP, the step of performing a signal transmission in at least part of the at least one BWP, or, receiving uplink control information (UCI) which is reported by the terminal device and corresponds to at least part of the at least one BWP.

An embodiment of the present disclosure provides a terminal device, wherein the terminal device includes: a first processing unit, for determining a priority of at least one bandwidth part BWP; a first communication unit, for performing a signal transmission in at least part of the at least one BWP, or, reporting uplink control information (UCI) corresponding to at least part of the at least one BWP, according to the priority of the at least one BWP.

An embodiment of the present disclosure provides a network device, where the network device includes: a second processing unit, for configuring a priority of at least one bandwidth part BWP for a terminal device; a second communication unit, for performing a signal transmission in at least part of the at least one BWP, or, receiving uplink control information (UCI) which is reported by the terminal device and corresponds to at least part of the at least one BWP, according to the priority of the at least one BWP.

An embodiment of the present disclosure provides a terminal device, including: a processor and a memory for storing a computer program that is capable of running on the processor, wherein the processor is used to execute steps of the above methods when running the computer program.

An embodiment of the present disclosure provides a network device, including: a processor and a memory for storing a computer program that is capable of running on the processor, wherein the processor is used to execute steps of the above methods when running the computer program.

An embodiment of this present disclosure provides a computer storage medium, having computer-executable instructions stored thereon, which when executed, implement the method steps of the above methods.

Using the technical solutions of the embodiments of the present disclosure, the priorities of different BWPs can be determined, so that the signal transmissions or the UCI reporting in the BWPs can be determined according to the priorities, and then the transmission performance of high-priority services can be guaranteed.

DESCRIPTION OF EMBODIMENTS

Figure 1:
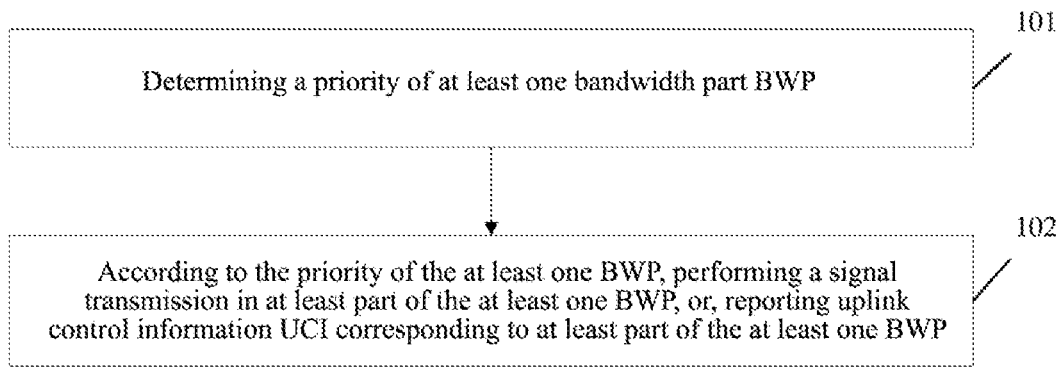
FIG. 1 is a flowchart of a method for transmitting data on a bandwidth part according to an embodiment of the present disclosure.

In order to understand the features and technical contents of embodiments of the present disclosure in more detail, the implementations of the embodiments of the present disclosure will be described in detail below with reference to the drawings. The attached drawings are for reference only and are not intended to limit the embodiments of the present disclosure.

Various inventive features are described below that can each be used independently of one another or in combination with other features.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Broadly, embodiments of the present embodiment provide a method and system for information processing technologies in a wireless communication system. Exemplary embodiments of the present embodiment provide methods and systems that transmit data on a bandwidth part, a terminal device, a network device and a computer storage medium.

Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction performance system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Usually, claim and description in all terms for using will be common in technical field according to them. Implication is explained, unless separately had clear and definite definition herein. For example, term "user equipment (UE)" can represent that any wireless apparatus can be carried out. Any suitable terminal of line communication, such as mobile phone or portable computer. Term "Radio Link" or "radio link" can be represented Wireless Telecom Equipment, such as UE, the program being connected to each other, and therefore can represent appointing in up-link (UL), down-link (DL), forward link (FL) and reverse link (RL). A generic term known as Bandwidth Part (BWP) is defined as a set of contiguous physical resource blocks (PRBs) in frequency domain which are configured for a user. Resource allocation will be done within a BWP. Several BWP may be configured to a user but only one will be activated at a given time instant. Within the BWP, various issues mentioned above have to be addressed since each BWP is configured in a UE specific manner. Furthermore, when different users are considered in the downlink, the sizes of the BWP supported by each user must also be accounted for as it impacts the pre-coding design, the channel and interference estimation as a result of the same etc. BWP is a concept which does not need any radio frequency (RF) involvement and it is a layer-1 concept. Multiple BWPs may be configured and activated to a UE and this entails new operations regarding monitoring timeline, BW sizes supported etc. These above mentioned issues will be described hereinafter in detail.

NR may be designed such that individual UEs can use smaller bandwidths than the system bandwidth. The UE bandwidth within a carrier, configured by the base station (BS) as the number of contiguous PRBs with an associated flexible subcarrier spacing (SCS) is called a bandwidth part (BWP). Once the BWP is activated, data and control channels are received/transmitted within the BWP. A UE can be configured with up to four BWPs, where BWPs may have different SCSs and may be mutually overlapping or non-overlapping in frequency. If more than one BWP is configured for a UE, the BS may select which BWP is active at a given time by means of downlink (DL) control. Therefore, the BS may adjust dynamically the UE bandwidth according to the amount/profile of data traffic for the UE. A reduction in the UE bandwidth may reduce the UE power consumption.

Transmit power (e.g., maximum transmit power) may be defined based on the maximum received signal strength allowed by a receiver and a minimum coupling loss from a transmitting node to a receiver. Transmit power may also be defined for an access node (e.g., a femto node) such that a corresponding outage created in a cell (e.g., a macro cell) is limited while still providing an acceptable level of coverage for access terminals associated with the access node.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

In the recent years, several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth generation wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the existing wireless communication system i.e. in LTE, the bandwidth of the system is limited to 20 MHz and various BW such as 1.4 MHz, 3 MHz, 5 MHz, 10 MHz, and 20 MHz are supported. In this LTE, the eNB and UE must support the same BW. However, going forward for the 5G systems, considering the wide available BW in mmWave spectrum and other parts of the spectrum, there is a lot of scope for freely using the large BW. The UE and base station (gNB) need not support the same BW and variable BW capable UE may be supported in such deployments. In order to support such wider BW UE, efficient mechanisms must be studied in order to support various operations such as search space configurations, efficient resource allocation mechanisms among others.

First Embodiment

An embodiment of the present disclosure provides a method for transmitting data on a bandwidth part, which is applied to a UE, such as a terminal device. As shown in FIG. 1, the method includes:

Step 101: determining a priority of at least one bandwidth part BWP;

Step 102: according to the priority of the at least one BWP, performing a signal transmission in at least part of the at least one BWP, or, reporting uplink control information UCI corresponding to at least part of the at least one BWP.

The following describes the above two steps in detail.

First, with respect to determining the priority of at least one BWP by the terminal device, the "at least one" may be one or more, for example.

The step of determining the priority of the at least one BWP includes: the step of determining the priority of the at least one BWP according to priority information indicated by a network side through higher layer signaling or downlink control information (DCI) signaling. The higher layer signaling may include, for example, radio resource control (RRC) messages or medium access control-Control Elements (MAC-CEs). Specifically, the UE, such as the terminal, determines the priority of the at least one BWP according to priority information indicated by the network side through higher layer signaling or DCI signaling.

The priority information indicated by the network side through higher layer signaling or DCI signaling includes: the step of obtaining priority information configured for each BWP by the network side, when receiving at least one BWP resource configured by the network side through the higher layer signaling; or, the step of obtaining N BWPs configured by the network side through radio resource control (RRC) signaling, where N is an integer greater than or equal to 1; the step of obtaining activation signaling for activating M BWPs which is sent by the network side through medium access control (MAC) signaling or DCI signaling, where M is an integer which is greater than or equal to 1 and is less than or equal to N; the step of determining priority information of the activated M BWPs based on the activation signaling.

Specifically, the network side can pre-configure N BWPs, for example, through RRC signaling, where N is an integer greater than 1. Further, the network side can activate M of the BWPs, for example, through MAC signaling or DCI signaling, where M is a positive integer less than or equal to N. Here, the at least one BWP may be the N BWPs or the M BWPs.

For example, when the network side configures a resource or resources of the at least one BWP to the terminal through higher layer signaling, the priority information of each BWP can be configured through corresponding higher layer signaling. Or, when the network side activates a BWP through MAC signaling or DCI signaling, the priority information of the activated BWP can be indicated through corresponding activation signaling (such as a bit or bits in DCI).

For example, the network side can configure N BWPs with priorities of 0, 1 . . . N−1, respectively, and the BWP with the priority of 0 has the highest priority, and so on.

In this way, if a service type of data scheduled on a BWP is dynamically changed, which depends entirely on the network-side scheduling, it is needed to dynamically indicate the priority of the BWP through DCI, so that the priority and the service type always correspond with each other.

In addition, other methods of determining the priority of the at least one BWP based on a preset rule can also be used.

In other words, the UEs, such as a terminal, determines the priority of the at least one BWP according to a rule agreed in advance with the network side. Specifically, the preset rule may determine the priority of the at least one BWP according to the index, bandwidth or subcarrier interval of the BWP. For example, the preset rule can be set according to actual needs: a BWP with a lower BWP index has a higher priority, or the larger (or smaller) the bandwidth occupied by a BWP, the higher the priority of this BWP.

In the above methods, the at least one BWP is generally the BWP(s) on a same carrier, that is, the priority of the BWP is the priority on the carrier where it is located. If the terminal is configured with multiple carriers, and each carrier contains at least one BWP, then when obtaining the priorities of BWPs on different carriers, the terminal can first compare the priorities between the carriers, and then compare the priorities between the BWPs within the carrier; or the priorities of the BWPs can be directly compared with each other, and if the BWP priorities are the same, then the priorities between the carriers are further compared.

Based on the above solutions, the implementation of the foregoing step 102 is further described in detail: according to the priority of the at least one BWP, the step of performing the signal transmission in the at least part of the at least one BWP, or, the step of reporting the uplink control information (UCI) corresponding to the at least part of the at least one BWP, includes the following multiple scenarios.

First Scenario.

The step of determining, according to the priority of the at least one BWP, the transmit power for performing the uplink signal transmission on the at least part of the at least one BWP when the at least one BWP is an uplink BWP includes: steps of allocating, according to the priority of the at least one BWP, the transmit power for the signal transmission on the of the at least one BWP among the multiple BWPs in the order of priority from high to low, when it is needed to simultaneously perform the uplink signal transmissions on at least two BWPs among the multiple BWPs and when a sum of the transmit power of the uplink signal transmissions on the at least two BWPs is greater than a maximum allowed transmit power.

In other words, if the terminal needs to perform uplink signal transmissions on multiple BWPs simultaneously, and the sum of the transmit power of the uplink signal transmissions on the multiple BWPs is greater than the maximum transmit power allowed by the terminal, the terminal allocates, according to the priorities of the multiple BWPs, the transmit power for the signal transmissions on the multiple BWPs in the order of priorities from high to low.

The uplink signal here may be physical uplink shared channel (PUSCH), physical uplink control channel (PUCCH) or uplink reference signal (such as sounding reference signal (SRS), demodulation reference signal (DMRS), phase tracking reference signals (PTRS), etc.).

For example, when the terminal needs to send data on two BWPs simultaneously, and the sum of the transmit power of the data on the two BWPs is greater than the maximum transmit power of the terminal, the terminal device may preferentially guarantee the transmit power of the data on the BWP with a higher priority, and reduces the transmit power of the data on the BWP with a lower priority. If the transmit power on the low-priority BWP is reduced to 0, the terminal does not need to send data on this BWP, that is, the data transmission is discarded.

Specifically, the step of determining, according to the priority of the at least one BWP, the transmit power for performing the uplink signal transmission on the at least one BWP among the multiple BWPs can also include: determining, according to the priority of the at least one BWP, a maximum allowed transmit power for performing an uplink signal transmission on each BWP of the at least one BWP.

For example, the maximum allowed transmit power corresponding to a BWP with a higher priority may be higher than that corresponding to a BWP with a lower priority. The values of the maximum transmit power corresponding to different priorities may be agreed upon in advance by the network side and the terminal.

In this way, the transmission performance of high-priority data or services can be preferentially guaranteed under a condition that the total transmit power be unchanged, thereby meeting the needs of high-priority data and services.

Second Scenario.

One embodiment of the disclosure may comprise the step of determining, according to the priority of the at least one BWP, whether to report the UCI in the at least one BWP, when the at least one BWP is an uplink BWP.

In other words, when the BWP is an uplink BWP, the terminal determines, according to the priority of the at least one BWP, whether to report the UCI in at least one BWP of the at least one BWP.

Specifically, if the terminal needs to report UCI corresponding to multiple downlink BWPs, the terminal can select one uplink BWP with the highest priority or the lowest priority according to the priorities of multiple uplink BWPs corresponding to the multiple downlink BWPs to report the UCI corresponding to the multiple downlink BWPs, and does not report UCI in other uplink BWPs.

In this way, the UCI can be transmitted on the BWP with a higher priority, thereby ensuring the transmission performance of the UCI.

Third Scenario.

Another embodiment of the disclosure may comprise the step of determining, according to the priority of the at least one BWP, whether to report the UCI corresponding to the at least one BWP among the multiple BWPs, when the at least one BWP is a downlink BWP.

In other words, when the BWP is a downlink BWP, the terminal determines, according to the priority of the at least one BWP, whether to report UCI corresponding to the at least one BWP.

Specifically, the step of determining, according to the priority of the at least one BWP, whether to report the UCI corresponding to the at least one BWP among the multiple BWPs may include: if there is a conflict between UCI corresponding to at least part of the at least one downlink BWP, the terminal preferentially transmits the UCI corresponding to at least one downlink BWP with a higher priority.

For example, if ACK/NACK (acknowledgement/not-acknowledgement) corresponding to N downlink BWPs needs to be reported to the network side simultaneously, but the physical uplink control channel (PUCCH) of the terminal can only bear part of the ACK/NACK, the terminal needs to transmit the ACK/NACK corresponding to K downlink BWPs with the highest priority through the PUCCH according to the priority order of the N downlink BWPs, where K is less than or equal to N.

For example, if channel state Information (CSI) corresponding to two downlink BWPs needs to be reported to the network side simultaneously, but the physical uplink control channel (PUCCH) of the terminal can only bear the CSI corresponding to one of the BWPs, the terminal should report only the CSI corresponding to the downlink BWP with a higher priority, and discard the CSI corresponding to the downlink BWP with a lower priority.

In this way, the ACK/NACK or CSI required for high-priority data or services can be preferentially transmitted, thereby ensuring the transmission performance of high-priority data and services.

Finally, it should be pointed out that the UCI may be ACK/NACK or channel state information (CSI) or reference signal received power reference signal received power (RSRP).

For example, the CSI may be at least one of a channel state information reference signal (CSI-RS) channel resource indicator (CRI), a rank indicator (RI), a precoding matrix indicator (PMI), a channel quality indicator (CQI), a strongest layer indicator (LI), and so on.

The step of performing the signal transmission in the at least one BWP among the multiple BWPs according to the priority of the at least one BWP includes: the step of determining, according to the priority of the at least one BWP, whether to send or receive a reference signal in the at least one BWP among the multiple BWPs.

Specifically, the step of determining, according to the priority of the at least one BWP, whether to send or receive the reference signal in the at least one BWP among the multiple BWPs includes: if uplink reference signals need to be sent simultaneously on at least two BWPs and different beams are configured for uplink reference signal transmissions on different BWPs, sending an uplink reference signal on only a BWP with the highest priority, or sending the uplink reference signals on the at least two BWPs using a beam which is used for sending an uplink reference signal on a BWP with the highest priority. In other words, if the terminal needs to send uplink reference signals simultaneously on multiple BWPs, and different beams are configured for uplink reference signal transmissions on different BWPs, then the terminal sends the uplink reference signal only on the BWP with the highest priority, or, the terminal sends the uplink reference signals on the multiple BWPs using a beam which is used for sending the uplink reference signal on the BWP with the highest priority.

For the first method, at this moment, the terminal may not transmit the corresponding uplink reference signals on the BWPs other than the BWP with the highest priority.

If the terminal needs to simultaneously send the uplink reference signals on at least two BWPs and the same beam is configured for uplink reference signal transmissions on different BWPs, the terminal can simultaneously transmit the uplink reference signals on the at least two BWPs.

Specifically, the step of determining, according to the priority of the at least one BWP, whether to send or receive the reference signal in the at least one BWP among the multiple BWPs includes: if downlink reference signals need to be received simultaneously on at least two BWPs and different beams need to be used to receive downlink reference signals on different BWPs, receiving a downlink reference signal on only a BWP with the highest priority, or receiving the downlink reference signals on the at least two BWPs using a beam which is used for receiving a downlink reference signal on a BWP with the highest priority.

For the first method, at this moment, the terminal does not receive the corresponding downlink reference signal on the BWP other than the BWP with the highest priority.

If the terminal needs to simultaneously receive the downlink reference signals on at least two BWPs and the downlink reference signals on different BWPs are received using the same beam, the terminal can simultaneously receive the downlink reference signals on the at least two BWPs.

In the present disclosure, a beam used for receiving a signal can also be described as a spatial domain reception filter used for receiving a signal. A beam used for sending a signal can also be described as a spatial domain transmission filter used for sending a signal. That two signals use different beams can be expressed as that the two signals use different spatial domain transmission filters. That two signals use the same beam or spatial domain transmission filter to send the signals can also be called that the two signals are quasi-co-located for spatial reception parameters.

In this way, the reference signals required for high-priority data or services can be preferentially sent or received, thereby ensuring the transmission performance of high-priority data and services.

It can be seen that using the above solutions, the priorities of different BWPs could be determined, so that the signal transmissions or the UCI reporting in the BWPs can be determined according to the priorities, and then the transmission performance of high-priority services can be guaranteed.

Second Embodiment

Figure 2:
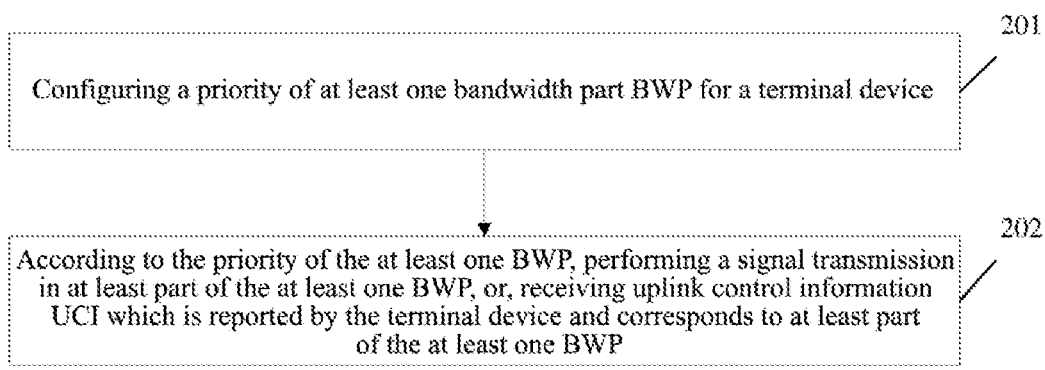
FIG. 2 is a flowchart of a method for transmitting data on a bandwidth part according to an embodiment of the present disclosure.

An embodiment of the present disclosure provides a method for transmitting data on a bandwidth part, which is applied to a network device. As shown in FIG. 2, the method includes:

Step 201: configuring a priority of at least one bandwidth part BWP for a terminal device;

Step 202: according to the priority of the at least one BWP, performing a signal transmission in at least one BWP among the multiple BWPs, or, receiving uplink control information UCI which is reported by the terminal device and corresponds to at least one BWP among the multiple BWPs.

The following describes the above two steps in detail.

First, with respect to configuring the priority of at least one BWP for the terminal device, the "at least one" may be one or more.

The step of configuring the priority of the at least one bandwidth part BWP for the terminal device includes the step of indicating priority information through higher layer signaling or DCI signaling, to configure the priority of the at least one BWP for the terminal device.

Specifically, the priority of the at least one BWP is determined according to priority information indicated by the network side through higher layer signaling or DCI signaling. The network side can pre-configure N BWPs through RRC signaling, where N is an integer greater than 1. Further, the network side can activate M of the BWPs through MAC signaling or DCI signaling, where M is a positive integer less than or equal to N. Here, the at least one BWP may be the N BWPs or the M BWPs.

For example, when the network side configures a resource or resources of the at least one BWP to the terminal through higher layer signaling, the priority information of each BWP can be configured through corresponding higher layer signaling. Or, when the network side activates a BWP through MAC signaling or DCI signaling, the priority information of the activated BWP can be indicated through corresponding activation signaling (such as a bit or bits in DCI).

For example, the network side can configure N BWPs with priorities of 0, 1 . . . N−1, respectively, wherein the BWP with the priority of 0 has the highest priority, and so on.

In this way, if a service type of data scheduled on a BWP can be dynamically changed, which depends entirely on the network-side scheduling, it is needed to dynamically indicate the priority of the BWP through DCI, so that the priority and the service type always correspond with each other.

In addition, other methods of determining the priority of the at least one BWP based on a preset rule can also be used:

In other words, the priority of the at least one BWP is determined according to a rule agreed upon in advance. Specifically, the preset rule may be used to determine the priority of the at least one BWP according to the index, bandwidth or subcarrier interval of the BWP. For example, it can be set according to actual needs: a BWP with a lower BWP index has a higher priority, or the larger (or smaller) the bandwidth occupied by a BWP, the higher the priority of this BWP.

In the above methods, the at least one BWP is generally the BWP(s) on a same carrier, that is, the priority of the BWP is the priority on the carrier where it is located. If the terminal is configured with multiple carriers, and each carrier contains at least one BWP, then when obtaining the priorities of BWPs on different carriers, the terminal can first compare the priorities between the carriers, and then compare the priorities between the BWPs within the carrier; or the priorities of the BWPs can be directly compared with each other, and if the BWP priorities are the same, then the priorities between the carriers are further compared.

Based on the above solutions, the implementation of the foregoing step 202 is further described in detail: according to the priority of the at least one BWP, the step of performing the signal transmission in the at least part of the at least one BWP, or, the step of receiving the uplink control information UCI which is reported by the terminal device and corresponds to at least part of the at least one BWP, includes the following scenarios.

First Scenario.

An exemplary embodiment may include the step of determining, according to the priority of the at least one BWP, whether to receive the UCI reported by the terminal device in the at least part of the at least one BWP, when the at least one BWP is an uplink BWP.

In one embodiment, when the BWP is an uplink BWP, the terminal determines, according to the priority of the at least one BWP, whether to report the UCI in the at least one BWP.

Specifically, if the terminal needs to report UCI corresponding to multiple downlink BWPs, the terminal can select one uplink BWP with the highest priority or the lowest priority according to the priorities of multiple uplink BWPs corresponding to the multiple downlink BWPs to report the UCI corresponding to the multiple downlink BWPs, and does not to report UCI in other uplink BWPs.

In this way, the UCI can be transmitted on the BWPs with a higher priority, thereby ensuring the transmission performance of the UCI.

Second Scenario.

One embodiment of the disclosure may comprise the step of determining, according to the priority of the at least one BWP, whether to receive the UCI which is reported by the terminal device and corresponds to the at least part of the at least one BWP, when the at least one BWP is a downlink BWP.

In one embodiment, when the BWP is a downlink BWP, the terminal determines, according to the priority of the at least one BWP, whether to report UCI corresponding to the at least one BWP.

Specifically, the step of determining, according to the priority of the at least one BWP, whether to report the UCI corresponding to the at least part of at the least one BWP includes: if there is a conflict between UCI corresponding to at least part of the at least one downlink BWP in the at least one downlink BWP is conflict, the terminal preferentially transmits the UCI corresponding to at least one downlink BWP with a higher priority.

For example, if ACK/NACK corresponding to N downlink BWPs needs to be reported to the network side simultaneously, but the PUCCH of the terminal can only bear part of the ACK/NACK, the terminal needs to transmit the ACK/NACK corresponding to K downlink BWPs with the highest priority through the PUCCH according to the priority order of the N downlink BWPs, where K is less than or equal to N.

For example, if CSI corresponding to two downlink BWPs needs to be reported to the network side simultaneously, but the PUCCH of the terminal can only bear the CSI corresponding to one of the BWPs, the terminal should report only the CSI corresponding to the downlink BWP with a higher priority, and discard the CSI corresponding to the downlink BWP with a lower priority.

In this way, the ACK/NACK or CSI required for high-priority data or services can be preferentially transmitted, thereby ensuring the transmission performance of high-priority data and services.

Finally, it should be pointed out that the UCI may be ACK/NACK or channel state information CSI or reference signal received power RSRP.

For example, the CSI may be at least one of a CSI-RS resource indicator (CRI), a rank indicator (RI), a precoding matrix indicator (PMI), a channel quality indicator (CQI), a strongest layer indicator LI, and so on.

The performing the signal transmission in the at least part of the at least one BWP according to the priority of the at least one BWP may include the step of determining, according to the priority of the at least one BWP, whether to send or receive a reference signal in the at least part of the at least one BWP.

Specifically, the step of determining, according to the priority of the at least one BWP, whether to send or receive the reference signal in the at least part of the at least one BWP includes:

if uplink reference signals need to be sent simultaneously on at least two BWPs and different beams are configured for uplink reference signal transmissions on different BWPs, sending an uplink reference signal on only a BWP with the highest priority, or sending the uplink reference signals on the at least two BWPs using a beam which is used for sending an uplink reference signal on a BWP with the highest priority.

In one embodiment, if the terminal needs to send uplink reference signals simultaneously on multiple BWPs, and different beams are configured for uplink reference signal transmissions on different BWPs, then the terminal sends the uplink reference signal only on the BWP with the highest priority, or, the terminal sends the uplink reference signals on the multiple BWPs using a beam which is used for sending the uplink reference signal on the BWP with the highest priority.

For the first method, at this moment, the terminal does not transmit the corresponding uplink reference signals on the BWPs other than the BWP with the highest priority.

If the terminal needs to simultaneously send the uplink reference signals on at least two BWPs and the same beam is configured for uplink reference signal transmissions on different BWPs, the terminal can simultaneously transmit the uplink reference signals on the at least two BWPs.

Specifically, the step of determining, according to the priority of the at least one BWP, whether to send or receive the reference signal in the at least part of the at least one BWP includes: if a downlink reference signal needs to be received simultaneously on at least two BWPs and different beams need to be used to receive downlink reference signals on different BWPs, receiving a downlink reference signal on only a BWP with the highest priority, or receiving the downlink reference signals on the at least two BWPs using a beam which is used for receiving a downlink reference signal on a BWP with the highest priority.

For the first method, at this moment, the terminal does not receive the corresponding downlink reference signals on the BWPs other than the BWP with the highest priority.

If the terminal needs to simultaneously receive the downlink reference signals on at least two BWPs and the downlink reference signals on different BWPs are received using the same beam, the terminal can simultaneously receive the downlink reference signals on the at least two BWPs.

In the present disclosure, a beam used for receiving a signal can also be described as a spatial domain reception filter used for receiving a signal. A beam used for sending a signal can also be described as a spatial domain transmission filter used for sending a signal. That two signals use different beams can be expressed as that the two signals use different spatial domain transmission filters. That two signals use the same beam or spatial domain transmission filter to send the signals can also be called that the two signals are quasi-co-located for spatial reception parameters.

In this way, the reference signals required for high-priority data or services can be preferentially sent or received, thereby ensuring the transmission performance of high-priority data and services.

It can be seen that using the above solutions, the priorities of different BWPs could be determined, so that the signal transmissions or the UCI reporting in the BWPs can be determined according to the priorities, and then the transmission performance of high-priority services can be guaranteed.

Third Embodiment

Figure 3:
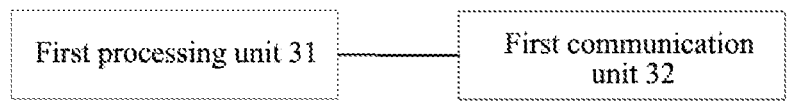
FIG. 3 is a block diagram of a terminal device according to another embodiment of the present disclosure.

An embodiment of the present disclosure provides a terminal device, as shown in FIG. 3, including: a first processing unit 31, for determining a priority of at least one bandwidth part BWP; a first communication unit 32, for performing a signal transmission in at least part of the at least one BWP, or, reporting uplink control information UCI corresponding to at least part of the at least one BWP, according to the priority of the at least one BWP.

The following describes the above two steps in detail.

First, with respect to determining the priority of at least one BWP by the terminal device, the "at least one" may be one or more.

The first processing unit 31 determines the priority of the at least one BWP according to priority information indicated by a network side through higher layer signaling or downlink control information DCI signaling. Specifically, the terminal device determines the priority of the at least one BWP according to priority information indicated by the network side through higher layer signaling or DCI signaling.

The priority information indicated by the network side through higher layer signaling or DCI signaling includes: the step of obtaining priority information configured for each BWP by the network side, when receiving at least one BWP resource configured by the network side through the higher layer signaling; or, the step of obtaining N BWPs configured by the network side through RRC signaling, where N is an integer greater than or equal to 1; obtaining activation signaling for activating M BWPs which is sent by the network side through MAC signaling or DCI signaling, where M is an integer which is greater than or equal to 1 and is less than or equal to N; determining priority information of the activated M BWPs based on the activation signaling.

Specifically, the network side can pre-configure N BWPs through RRC signaling, where N is an integer greater than 1. Further, the network side can activate M of the BWPs through MAC signaling or DCI signaling, where M is a positive integer less than or equal to N. Here, the at least one BWP may be the N BWPs or the M BWPs.

For example, when the network side configures a resource or resources of the at least one BWP to the terminal through higher layer signaling, the priority information of each BWP can be configured through corresponding higher layer signaling. Or, when the network side activates a BWP through MAC signaling or DCI signaling, the priority information of the activated BWP can be indicated through corresponding activation signaling (such as a bit or bits in DCI).

For example, the network side can configure N BWPs with priorities of 0, 1 . . . N−1, respectively, where the BWP with the priority of 0 has the highest priority, and so on.

In this way, if a service type of data scheduled on a BWP can be dynamically changed, which depends entirely on the network-side scheduling, it is needed to dynamically indicate the priority of the BWP through DCI, so that the priority and the service type always correspond with each other.

In addition, other methods can also be used: the first processing unit 31 determines the priority of the at least one BWP based on a preset rule.

In one embodiment, the terminal determines the priority of the at least one BWP according to a rule agreed in advance with the network side. Specifically, the preset rule may be used to determine the priority of the at least one BWP according to the index, bandwidth or subcarrier interval of the BWP. For example, it can be set according to actual needs: a BWP with a lower BWP index has a higher priority, or the larger (or smaller) the bandwidth occupied by a BWP, the higher the priority of this BWP.

In the above methods, the at least one BWP is generally the BWP(s) on a same carrier, that is, the priority of the BWP is the priority on the carrier where it is located. If the terminal is configured with multiple carriers, and each carrier contains at least one BWP, then when obtaining the priorities of BWPs on different carriers, the terminal can first compare the priorities between the carriers, and then compare the priorities between the BWPs within the carrier; or the priorities of the BWPs can be directly compared with each other, and if the BWP priorities are the same, then the priorities between the carriers are further compared.

Based on the above solutions, according to the priority of the at least one BWP, the step of performing the signal transmission in the at least part of the at least one BWP, or, the step of reporting the uplink control information UCI corresponding to the at least part of the at least one BWP, may include the following multiple scenarios.

First Scenario.

The first communication unit 32 determines, according to the priority of the at least one BWP, a transmit power for performing an uplink signals transmission on the at least part of the at least one BWP, when the at least one BWP is an uplink BWP.

Specifically, the first communication unit 32 allocates, according to priorities of at least two BWPs, the transmit power for the signal transmissions on the at least two BWPs in the order of priorities from high to low, when it is needed to simultaneously perform the uplink signal transmissions on the at least two BWPs and when a sum of the transmit power of the uplink signal transmissions on the at least two BWPs is greater than a maximum allowed transmit power.

In one embodiment, if the terminal needs to perform uplink signal transmissions on the multiple BWPs simultaneously, and the sum of the transmit power of the uplink signal transmissions on the multiple BWPs is greater than the maximum transmit power allowed by the terminal, the terminal allocates, according to the priorities of the multiple BWPs, transmit power for the signal transmissions on the multiple BWPs in the order of priorities from high to low.

The uplink signal here may be physical uplink shared channel (PUSCH), physical uplink control channel (PUCCH) or uplink reference signal (such as sounding reference signal (SRS), demodulation reference signal (DMRS), phase tracking reference signals (PTRS), etc.). For example, when the terminal needs to send data on two BWPs simultaneously, and the sum of the transmit power of the data on the two BWPs is greater than the maximum transmit power of the terminal, the terminal device preferentially guarantee the transmit power of the data on the BWP with a higher priority, and reduces the transmit power of the data on the BWP with a lower priority. If the transmit power on the low-priority BWP is reduced to 0, the terminal does not need to send data on this BWP, that is, the data transmission is discarded.

Specifically, the first communication unit 32 determines, according to the priority of the at least one BWP, a maximum allowed transmit power for performing an uplink signal transmission on each BWP of the at least one BWP.

For example, the maximum allowed transmit power corresponding to a BWP with a higher priority may be higher than that corresponding to a BWP with a lower priority. The values of the maximum transmit power corresponding to different priorities may be agreed in advance by the network side and the terminal.

In this way, the transmission performance of high-priority data or services can be preferentially guaranteed under a condition that the total transmit power is unchanged, thereby meeting the needs of high-priority data and services.

Second Scenario.

The first communication unit 32 determines, according to the priority of the at least one BWP, whether to report the UCI in the at least part of the at least one BWP, when the at least one BWP is an uplink BWP.

In one embodiment, the at least one BWP is an uplink BWP, and the terminal determines, according to the priority of the at least one BWP, whether to report the UCI in the at least one BWP.

Specifically, if the terminal needs to report UCI corresponding to multiple downlink BWPs, the terminal can select one uplink BWP with the highest priority or the lowest priority according to the priorities of multiple uplink BWPs corresponding to the multiple downlink BWPs to report the UCI corresponding to the multiple downlink BWPs, and does not to report UCI in other uplink BWPs.

In this way, the UCI can be transmitted on the BWPs with a higher priority, thereby ensuring the transmission performance of the UCI.

Third Scenario. The first communication unit 32 determines, according to the priority of the at least one BWP, whether to report the UCI corresponding to the at least part of the at least one BWP, when the at least one BWP is a downlink BWP.

In one embodiment, when the BWP is a downlink BWP, the terminal determines, according to the priority of the at least one BWP, whether to report UCI corresponding to the at least one BWP.

Specifically, the first communication unit 32, if there is a conflict between UCI corresponding to at least part of the at least one downlink BWP, preferentially transmits the UCI corresponding to at least one downlink BWP with a higher priority.

For example, if ACK/NACK corresponding to N downlink BWPs needs to be reported to the network side simultaneously, but the PUCCH of the terminal can only bear part of the ACK/NACK, the terminal needs to transmit the ACK/NACK corresponding to K downlink BWPs with the highest priority through the PUCCH according to the priority order of the N downlink BWPs, where K is less than or equal to N.

For example, if CSI corresponding to two downlink BWPs needs to be reported to the network side simultaneously, but the PUCCH of the terminal can only bear the CSI corresponding to one of the BWPs, the terminal should report only the CSI corresponding to the downlink BWP with a higher priority, and discard the CSI corresponding to the downlink BWP with a lower priority.

In this way, the ACK/NACK or CSI required for high-priority data or services can be preferentially transmitted, thereby ensuring the transmission performance of high-priority data and services.

Finally, it should be pointed out that the UCI may be ACK/NACK or channel state information CSI or reference signal received power RSRP.

For example, the CSI may be at least one of a CSI-RS resource indicator CRI, a rank indicator RI, a precoding matrix indicator PMI, a channel quality indicator CQI, a strongest layer indicator LI, and so on.

The first communication unit 32 determines, according to the priority of the at least one BWP, whether to send or receive a reference signal in the at least part of the at least one BWP.

Specifically, if uplink reference signals need to be sent simultaneously on at least two BWPs and different beams are configured for uplink reference signal transmissions on different BWPs, then the first communication unit 32 sends an uplink reference signal on only a BWP with the highest priority, or sends the uplink reference signals on the at least two BWPs using a beam which is used for sending an uplink reference signal on the BWP with the highest priority.

In one embodiment, if the terminal needs to send uplink reference signals simultaneously on multiple BWPs, and different beams are configured for uplink reference signal transmissions on different BWPs, then the terminal sends the uplink reference signal only on the BWP with the highest priority, or, the terminal sends the uplink reference signals on the multiple BWPs using a beam which is used for sending the uplink reference signal on the BWP with the highest priority.

For the first method, at this moment, the terminal does not transmit the corresponding uplink reference signals on the BWPs other than the BWP with the highest priority.

If the terminal needs to simultaneously send the uplink reference signals on at least two BWPs and the same beam is configured for uplink reference signal transmissions on different BWPs, the terminal can simultaneously transmit the uplink reference signals on the at least two BWPs.

Specifically, if downlink reference signals need to be received simultaneously on at least two BWPs and different beams need to be used to receive downlink reference signals on different BWPs, then the first communication unit 32 receives a downlink reference signal on only a BWP with the highest priority, or receiving the downlink reference signals on the at least two BWPs using a beam which is used for receiving a downlink reference signal on a BWP with the highest priority.

For the first method, at this moment, the terminal does not receive the corresponding downlink reference signals on the BWPs other than the BWP with the highest priority.

If the terminal needs to simultaneously receive the downlink reference signals on at least two BWPs and the downlink reference signals on different BWPs are received using the same beam, the terminal can simultaneously receive the downlink reference signals on the at least two BWPs.

In the present disclosure, a beam used for receiving a signal can also be described as a spatial domain reception filter used for receiving a signal. A beam used for sending a signal can also be described as a spatial domain transmission filter used for sending a signal. That two signals use different beams can be expressed as that the two signals using different spatial domain transmission filters. That two signals use the same beam or spatial domain transmission filter to send the signals can also be called that the two signals are quasi-co-located for spatial reception parameters.

In this way, the reference signals required for high-priority data or services can be preferentially sent or received, thereby ensuring the transmission performance of high-priority data and services.

It can be seen that using the above solutions, the priorities of different BWPs could be determined, so that the signal transmissions or the UCI reporting in the BWPs can be determined according to the priorities, and then the transmission performance of high-priority services can be guaranteed.

Fourth Embodiment

Figure 4:
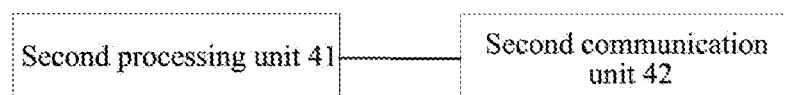
FIG. 4 is a block diagram of a network device according to an embodiment of the present disclosure.

An embodiment of the present disclosure provides a network device, as shown in FIG. 4, including:

a second processing unit 41, for configuring a priority of at least one bandwidth part BWP for a terminal device;

a second communication unit 42, for performing a signal transmission in at least part of the at least one BWP, or, receiving uplink control information UCI which is reported by the terminal device and corresponds to at least part of the at least one BWP, according to the priority of the at least one BWP.

The following describes the above two steps in detail.

Firstly, with respect to determining the priority of at least one BWP by the terminal device, the at least one may be one or more.

The second processing unit 41 indicates priority information through higher layer signaling or DCI signaling, to configure the priority of the at least one BWP for the terminal device.

Specifically, the priority of the at least one BWP is determined according to priority information indicated by the network side through higher layer signaling or DCI signaling. The network side can pre-configure N BWPs through RRC signaling, where N is an integer greater than 1. Further, the network side can activate M of the BWPs through MAC signaling or DCI signaling, where M is a positive integer less than or equal to N. Here, the at least one BWP may be the N BWPs or the M BWPs.

For example, when the network side configures a resource/resources of the at least one BWP to the terminal through higher layer signaling, the priority information of each BWP can be configured through corresponding higher layer signaling. Or, when the network side activates a BWP through MAC signaling or DCI signaling, the priority information of the activated BWP can be indicated through corresponding activation signaling (such as a bit or bits in DCI).

For example, the network side can configure N BWPs with priorities of 0, 1 . . . N−1, respectively, where the BWP with the priority of 0 has the highest priority, and so on.

In this way, if a service type of data scheduled on a BWP can be dynamically changed, which depends entirely on the network-side scheduling, it is needed to dynamically indicate the priority of the BWP through DCI, so that the priority and the service type always correspond with each other.

In addition, the second processing unit 41 determines the priority of the at least one BWP based on a preset rule.

In one embodiment, the network side determines the priority of the at least one BWP according to a rule agreed in advance with the terminal. Specifically, the preset rule may be used to determine the priority of the at least one BWP according to the index, bandwidth or subcarrier interval of the BWP. For example, it can be set according to actual needs: a BWP with a lower BWP index has a higher priority, or the larger (or smaller) the bandwidth occupied by a BWP, the higher the priority of this BWP.

In the above methods, the at least one BWP is generally the BWP(s) on a same carrier, that is, the priority of the BWP is the priority on the carrier where it is located. If the terminal device is configured with multiple carriers, and each carrier contains at least one BWP, then when obtaining the priorities of BWPs on different carriers, the terminal can first compare the priorities between the carriers, and then compare the priorities between the BWPs within the carrier; or the priorities of the BWPs can be directly compared with each other, and if the BWP priorities are the same, then the priorities between the carriers are further compared.

Based on the above solutions, according to the priority of the at least one BWP, the step of performing the signal transmission in the at least part of the at least one BWP, or, the step of receiving the uplink control information UCI which is reported by the terminal device and corresponds to at least part of the at least one BWP, further includes the following scenarios.

First Scenario.

The second communication unit 42 determines, according to the priority of the at least one BWP, whether to receive the UCI reported by the terminal device in the at least part of the at least one BWP, when the at least one BWP is an uplink BWP.

In one embodiment, when the BWP is an uplink BWP, the terminal determines, according to the priority of the at least one BWP, whether to report the UCI in at least one BWP of the at least one BWP.

Specifically, if the terminal needs to report UCI corresponding to multiple downlink BWPs, the terminal can select one uplink BWP with the highest priority or the lowest priority according to the priorities of multiple uplink BWPs corresponding to the multiple downlink BWPs to report the UCI corresponding to the multiple downlink BWPs, and does not to report UCI in other uplink BWPs.

In this way, the UCI can be transmitted on the BWPs with a higher priority, thereby ensuring the transmission performance of the UCI.

Second Scenario.

The second communication unit 42 determines, according to the priority of the at least one BWP, whether to receive the UCI which is reported by the terminal device and corresponds to the at least part of the at least one BWP, when the at least one BWP is a downlink BWP.

In one embodiment, when the BWP is a downlink BWP, the terminal determines, according to the priority of the at least one BWP, whether to report UCI corresponding to at least one BWP of the at least one BWP.

Specifically, for the second communication unit 42, if there is a conflict between UCI corresponding to at least part of the at least one downlink BWP, the terminal device preferentially transmits the UCI corresponding to at least one downlink BWP with a higher priority.

For example, if ACK/NACK corresponding to N downlink BWPs needs to be reported to the network side simultaneously, but the PUCCH of the terminal can only bear part of the ACK/NACK, the terminal needs to transmit the ACK/NACK corresponding to K downlink BWPs with the highest priority through the PUCCH according to the priority order of the N downlink BWPs, where K is less than or equal to N.

For example, if CSI corresponding to two downlink BWPs needs to be reported to the network side simultaneously, but the PUCCH of the terminal can only bear the CSI corresponding to one of the BWPs, the terminal should report only the CSI corresponding to the downlink BWP with a higher priority, and discard the CSI corresponding to the downlink BWP with a lower priority.

In this way, the ACK/NACK or CSI required for high-priority data or services can be preferentially transmitted, thereby ensuring the transmission performance of high-priority data and services.

Finally, it should be pointed out that the UCI may be ACK/NACK or channel state information CSI or reference signal received power RSRP.

For example, the CSI may be at least one of a CSI-RS resource indicator CRI, a rank indicator RI, a precoding matrix indicator PMI, a channel quality indicator CQI, a strongest layer indicator LI, and so on.

The second communication unit 42 determines, according to the priority of the at least one BWP, whether to send or receive a reference signal in the at least part of the at least one BWP.

Specifically, the step of determining, according to the priority of the at least one BWP, whether to send or receive the reference signal in the at least part of the at least one BWP includes:

if uplink reference signals need to be sent simultaneously on at least two BWPs and different beams are configured for uplink reference signal transmissions on different BWPs, sending an uplink reference signal on only a BWP with the highest priority, or sending the uplink reference signals on the at least two BWPs using a beam which is used for sending an uplink reference signal on a BWP with the highest priority.

In one embodiment, if the terminal needs to send uplink reference signals simultaneously on multiple BWPs, and different beams are configured for uplink reference signal transmissions on different BWPs, then the terminal sends the uplink reference signal only on the BWP with the highest priority, or, the terminal sends the uplink reference signals on the multiple BWPs using a beam which is used for sending the uplink reference signal on the BWP with the highest priority.

For the first method, at this moment, the terminal does not transmit the corresponding uplink reference signals on the BWPs other than the BWP with the highest priority.

If the terminal needs to simultaneously send the uplink reference signals on at least two BWPs and the same beam is configured for uplink reference signal transmissions on different BWPs, the terminal can simultaneously transmit the uplink reference signals on the at least two BWPs.

Specifically, if downlink reference signals need to be received simultaneously on at least two BWPs, and different beams need to be used to receive downlink reference signals on different BWPs, then the second communication unit 42 receives a downlink reference signal on only a BWP with the highest priority, or receives the downlink reference signals on the at least two BWPs using a beam which is used for receiving a downlink reference signal on a BWP with the highest priority.

For the first method, at this moment, the terminal does not receive the corresponding downlink reference signals on the BWPs other than the BWP with the highest priority.

If the terminal needs to simultaneously receive the downlink reference signals on at least two BWPs, and the downlink reference signals on different BWPs are received using the same beam, the terminal can simultaneously receive the downlink reference signals on the at least two BWPs.

In the present disclosure, a beam used for receiving a signal can also be described as a spatial domain reception filter used for receiving a signal. A beam used for sending a signal can also be described as a spatial domain transmission filter used for sending a signal. That two signals use different beams can be expressed as that the two signals use different spatial domain transmission filters. That two signals use the same beam or spatial domain transmission filter to send the signals and can also be called that the two signals are quasi-co-located for spatial reception parameters.

In this way, the reference signals required for high-priority data or services can be preferentially sent or received, thereby ensuring the transmission performance of high-priority data and services.

It can be seen that using the above solutions, the priorities of different BWPs could be determined, so that the signal transmissions or the UCI reporting in the BWPs can be determined according to the priorities, and then the transmission performance of high-priority services can be guaranteed.

Figure 5:
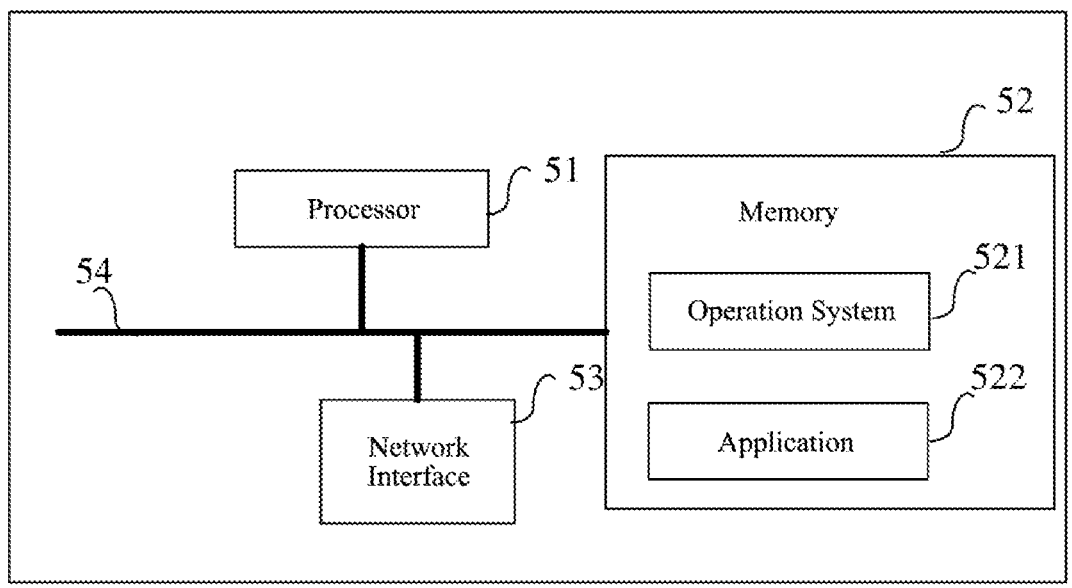
FIG. 5 is a block diagram of a hardware architecture according to an embodiment of the present disclosure.

An embodiment of the present disclosure also provides a hardware architecture of a terminal device or a network device, as shown in FIG. 5, including: at least one processor 51, a memory 52, and at least one network interface 53. The various components are coupled together via a bus system 54. Understandably, the bus system 54 is used to implement connection and communication between these components. In addition to a data bus, the bus system 54 also includes a power bus, a control bus, and a status signal bus. However, for clarity, various buses are marked as the bus system 54 in FIG. 5.

It can be understood that the memory 52 in the embodiment of the present disclosure may be a volatile memory or a nonvolatile memory, or may include both volatile and nonvolatile memories.

In some implementations, the memory 52 stores the following elements, executable modules or data structures, or their subsets, or their extensions: an operating system 521 and an application 522.

The processor 51 is used to be able to process the method steps of the foregoing first embodiment, which will not be repeated here.

An embodiment of the present disclosure provides a computer storage medium that stores computer-executable instructions. When the computer-executable instructions are executed, the method steps of the foregoing embodiments are implemented.

If the above apparatuses in the embodiments of the present disclosure are implemented in the form of software functional modules and sold or used as an independent product, they may also be stored in a computer-readable storage medium. Based on such understanding, the essence, or the part contributing to the prior art, of the technical solutions of the embodiments of the present disclosure can be embodied in the form of software product. The computer software product is stored in a storage medium, and includes several instructions to cause a computer device (which may be a personal computer, server, or network device, etc.) to perform all or part of the methods described in the embodiments of the present disclosure. The foregoing storage medium includes various media that can store program codes, such as a U disk, a mobile hard disk, a read-only memory (ROM, Read Only Memory), a magnetic disk, or an optical disk. In this way, the embodiments of the present disclosure are not limited to any specific combination of hardware and software.

Correspondingly, an embodiment of the present disclosure also provides a computer storage medium in which a computer program is stored, and the computer program is used to execute the methods for transmitting data on bandwidth part of the embodiments of the present disclosure.

Although the preferred embodiments of the present disclosure have been disclosed for illustrative purposes, those skilled in the art will realize that various improvements, additions and substitutions are also possible, and therefore, the scope of the present disclosure should not be limited to the above-described embodiments.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item.

It should be understood, of course, that the foregoing relates to exemplary embodiments of the invention and that modifications may be made without departing from the spirit and scope of the invention as set forth in the following claims.

What is claimed is:

1. A method for determining priorities of multiple bandwidth parts (BWPs), which is applied to a terminal device, wherein the method comprises:
    determining priorities of multiple BWPs;
    according to the priorities of the multiple BWPs, reporting uplink control information (UCI) corresponding to at least one BWP among the multiple BWPs;
    wherein according to the priorities of the multiple BWPs, reporting the UCI corresponding to the at least one BWP among the multiple BWPs comprises:
    determining whether to report the UCI in the at least one BWP among the multiple BWPs according to the priorities of the multiple BWPs, when the multiple BWPs are uplink BWPs; or
    determining whether to report the UCI corresponding to the at least one BWP among the multiple BWPs according to the priorities of the multiple BWPs, when the multiple BWPs are downlink BWPs.

2. The method according to claim 1, wherein the step of determining the priorities of the multiple BWPs comprises:
    determining the priorities of the multiple BWPs according to priority information indicated by a network side through higher layer signaling or downlink control information (DCI) signaling; or
    determining the priorities of the multiple BWPs based on a preset rule.

3. The method according to claim 2, wherein the priority information indicated by the network side through the higher layer signaling or the DCI signaling comprises:
    obtaining priority information configured for each BWP by the network side, when receiving at least one BWP resource configured by the network side through the higher layer signaling.

4. The method according to claim 2, wherein the priority information indicated by the network side through the higher layer signaling or the DCI signaling comprises:
    obtaining N BWPs configured by the network side through radio resource control (RRC) signaling, wherein N is an integer greater than 1;
    obtaining activation signaling for activating M BWPs which is sent by the network side through medium access control (MAC) signaling or the DCI signaling, wherein M is an integer which is greater than or equal to 1 and is less than or equal to N;
    determining priority information of the activated M BWPs based on the activation signaling.

5. The method according to claim 1, wherein the method further comprises:
    determining a transmit power for performing an uplink signal transmission on the at least one BWP among the multiple BWPs according to the priorities of the multiple BWPs, when the multiple BWPs are uplink BWPs.

6. The method according to claim 5, wherein the step of determining the transmit power for performing the uplink signal transmission on the at least one BWP among the multiple BWPs according to the priorities of the multiple BWPs comprises:
    allocating the transmit power for uplink signal transmissions on at least two BWPs among the multiple BWPs in order of priorities from high to low according to the priorities of the multiple BWPs, when simultaneous uplink signal transmissions are performed on the at least two BWPs and when a sum of the transmit power of the uplink signal transmissions on the at least two BWPs among the multiple BWPs is greater than a maximum allowed transmit power; or
    determining a maximum allowed transmit power for performing an uplink signal transmission on each BWP of the multiple BWPs according to the priorities of the multiple BWPs.

7. The method according to claim 1, wherein the step of determining whether to report the UCI corresponding to the at least one BWP among the multiple BWPs according to the priorities of the multiple BWPs when the multiple BWPs are downlink BWPs, comprises:
    when there is a conflict between UCI corresponding to at least two downlink BWPs among the multiple BWPs, preferentially transmitting, by the terminal device, UCI corresponding to at least one downlink BWP with a higher priority.

8. The method according to claim 1, wherein the method further comprises: according to the priorities of the multiple BWPs, performing a signal transmission in the at least one BWP among the multiple BWPs;
    wherein according to the priorities of the multiple BWPs, performing the signal transmission in the at least one BWP among the multiple BWPs comprises:
    determining whether to send or receive a reference signal in the at least one BWP among the multiple BWPs according to the priorities of the multiple BWPs.

9. The method according to claim 8, wherein the step of determining whether to send or receive the reference signal in the at least one BWP among the multiple BWPs according to the priorities of the multiple BWPs comprises:
    when uplink reference signals need to be sent simultaneously on at least two BWPs among the multiple BWPs and different beams are configured for uplink reference signal transmissions on different BWPs, sending an uplink reference signal only on a BWP with a highest priority, or sending the uplink reference signal on the at least one BWP among the multiple BWPs using a beam which is used for sending an uplink reference signal on a BWP with the highest priority.

10. The method according to claim 8, wherein the step of determining whether to send or receive the reference signal in the at least one BWP among the multiple BWPs according to the priorities of the multiple BWPs, comprises:
  when downlink reference signals need to be received simultaneously on the at least one BWP among the multiple BWPs and different beams need to be used to receive downlink reference signals on different BWPs, receiving a downlink reference signal only on a BWP with a highest priority, or receiving the downlink reference signals on the at least one BWP among the multiple BWPs using a beam which is used for receiving a downlink reference signal on a BWP with the highest priority.

11. A terminal device, comprising: a processor and a memory for storing a computer program that is capable of running on the processor,
  wherein the processor is used to execute the following steps:
  determining priorities of multiple BWPs;
  according to the priorities of the multiple BWPs, reporting uplink control information (UCI) corresponding to at least one BWP among the multiple BWPs;
  wherein according to the priorities of the multiple BWPs, reporting the UCI corresponding to the at least one BWP among the multiple BWPs comprises:
  determining whether to report the UCI in the at least one BWP among the multiple BWPs according to the priorities of the multiple BWPs, when the multiple BWPs are uplink BWPs; or
  determining whether to report the UCI corresponding to the at least one BWP among the multiple BWPs according to the priorities of the multiple BWPs, when the multiple BWPs are downlink BWPs.

12. The terminal device according to claim 11, wherein the processor is further used to execute the following steps:
  determining the priorities of the multiple BWPs according to priority information indicated by a network side through higher layer signaling or downlink control information (DCI) signaling; or
  determining the priorities of the multiple BWPs based on a preset rule.

13. The terminal device according to claim 12, wherein the processor is further used to execute the following step:
  obtaining priority information configured for each BWP by the network side, when receiving at least one BWP resource configured by the network side through the higher layer signaling.

14. The terminal device according to claim 12, wherein the processor is further used to execute the following steps:
  obtaining N BWPs configured by the network side through radio resource control (RRC) signaling, wherein N is an integer greater than 1;
  obtaining activation signaling for activating M BWPs which is sent by the network side through medium access control (MAC) signaling or the DCI signaling, wherein M is an integer which is greater than or equal to 1 and is less than or equal to N;
  determining priority information of the activated M BWPs based on the activation signaling.

15. The terminal device according to claim 11, wherein the processor is further used to execute the following step:
  determining a transmit power for performing an uplink signal transmission on the at least one BWP among the multiple BWPs according to the priorities of the multiple BWPs, when the at least one BWP is an uplink BWP.

16. The terminal device according to claim 15, wherein the processor is further used to execute the following steps:
  allocating the transmit power for the signal transmission on the at least one BWP among the multiple BWPs in order of priorities from high to low according to the priorities of the multiple BWPs, when simultaneous uplink signal transmissions are performed on the at least one BWP among the multiple BWPs and when a sum of the transmit power of the uplink signal transmission on the at least one BWP among the multiple BWPs is greater than a maximum allowed transmit power; or
  determining a maximum allowed transmit power for performing an uplink signal transmission on each BWP of the multiple BWPs according to the priorities of the multiple BWPs.

17. The terminal device according to claim 11, wherein the processor is further used to execute the following step:
  when there is a conflict between UCI corresponding to at least two downlink BWPs among the multiple BWPs, preferentially transmitting, by the terminal device, UCI corresponding to at least one downlink BWP with a higher priority.

18. The terminal device according to claim 11, wherein the processor is further used to execute the following step:
  determining whether to send or receive a reference signal in the at least one BWP among the multiple BWPs according to the priorities of the multiple BWPs.

19. The terminal device according to claim 18, wherein the processor is further used to execute the following steps:
  when uplink reference signals need to be sent simultaneously on the at least one BWP among the multiple BWPs and different beams are configured for uplink reference signal transmissions on different BWPs, sending an uplink reference signal only on a BWP with a highest priority, or sending the uplink reference signal on the at least one BWP among the multiple BWPs using a beam which is used for sending an uplink reference signal on a BWP with the highest priority.

20. The terminal device according to claim 18, wherein the processor is further used to execute the following steps:
  when downlink reference signals need to be received simultaneously on the at least one BWP among the multiple BWPs and different beams need to be used to receive downlink reference signals on different BWPs, receiving a downlink reference signal only on a BWP with a highest priority, or receiving the downlink reference signals on the at least one BWP among the multiple BWPs using a beam which is used for receiving a downlink reference signal on a BWP with the highest priority.

* * * * *